United States Patent

Matusda et al.

[11] Patent Number: 5,512,240
[45] Date of Patent: Apr. 30, 1996

[54] TUNGSTEN ELECTRODE MATERIAL

[75] Inventors: Fukuhisa Matusda; Masao Ushio, both of Kawanishi; Kiyoyuki Hasegawa, Fukagawa; Katsuyoshi Akabane, Fukagawa; Takashi Matsuno, Fukagawa, all of Japan

[73] Assignees: Toho Kinzoku Co., Ltd., Osaka; Hokkai Tungsten Industrial Co. Ltd., Fukagawa, both of Japan

[21] Appl. No.: 211,236

[22] PCT Filed: Jul. 9, 1993

[86] PCT No.: PCT/JP93/00947

§ 371 Date: Dec. 30, 1994

§ 102(e) Date: Dec. 30, 1994

[87] PCT Pub. No.: WO94/03650

PCT Pub. Date: Feb. 17, 1994

[30] Foreign Application Priority Data

Jul. 31, 1992 [JP] Japan ................................ 4-224757
Apr. 14, 1993 [JP] Japan ................................ 5-112138

[51] Int. Cl.$^6$ .................................................. C22C 27/04
[52] U.S. Cl. .......................... 420/430; 420/431; 75/244; 75/248
[58] Field of Search ..................... 420/431; 148/423; 75/244, 248

[56] References Cited

U.S. PATENT DOCUMENTS 4,908,182  3/1990  Whang ................................... 420/430

FOREIGN PATENT DOCUMENTS 51-4697  1/1976  Japan ................................... 420/431

Primary Examiner—John Sheehan
Attorney, Agent, or Firm—Armstrong, Westerman, Hattori, McLeland & Naughton

[57] ABSTRACT

An arc discharge electrode material used for various electrode materials for arc welding, which is excellent in arc ignitability and consumability. The composition is 0.02 to 1.0 wt % lanthanum boride and the rest of tungsten.

1 Claim, 2 Drawing Sheets

TUNGSTEN ELECTRODE MATERIAL

FIELD OF INVENTION

The present invention relates to tungsten electrode materials with excellent arc ignitability and high wear resistance. For arc discharge electrode materials used for arc welding, high arc ignitability and wear resistance are required. Conventionally, for satisfying these characteristics, thoriated tungsten in which thorium oxide is contained in tungsten has been extensively used.

The above-mentioned thoriated tungsten is used for TIG welding, plasma welding, and plasma spraying, and though thoriated tungsten is material with excellent arc ignitability and wear resistance, it consumes excessively when applied for high-current density large-size plasma electrodes for melt-refining or high-temperature combustion, and a desired object is unable to be achieved. Conventionally, the use under atmospheric pressure has been most popular but in recent years, as welding technique is advanced, the use under severe conditions such as high pressure and reduced pressure has been increased, and conventional thoriated tungsten is no longer able to satisfy the requirements.

In addition, because thorium oxide powders which are used for raw material are radioactive material, it has problems of increased difficulty in procurement, increased costs, and severe control required for storage and handling by laws. In the application, thorium oxide is aggresively consumed and evaporates to create serious problems from viewpoint of health control of workers and air pollution. Therefore, it is an object of the present invention to solve the above-mentioned problems of conventional thoriated tungsten and to provide electrode material with more excellent capabilities.

DISCLOSURE OF THE INVENTION

In order to solve the above problems, research has been made on various components, and the research results have indicated that the material comprising tungsten to which lanthanum boride is added provides excellent arc ignitability and wear resistance. That is, the essential of the present invention is to provide tungsten electrode material that contains 0.01–1.0% lanthanum boride by weight and tungsten for the remainder.

The electrode material of the present invention is fabricated, for example, as follows. First of all, lanthanum boride powders are dry-mixed to the material metal tungsten powders until lanthanum boride powders are uniformly dispersed. The mean particle size of powders shall be, for example, 2–4 microns, while that of lanthanum boride shall be, for example, 1–3 microns. The powder mixture is press-formed in a conventional method in powder metallurgy and after sintering, the sintered compacts are subject to necessary processing such as swaging, drawing, and the like to make a desired electrode material. This electrode material contains lanthanum boride in addition to main component tungsten, providing excellent wear resistance and arc ignitability.

It is preferable to contain lanthanum boride in the range from 0.02 to 1.0 wt. % (same applies correspondigly to the following). If the content of lanthanum boride is lower than 0.02%, the performance would not significantly differ from that of pure tungsten free from lanthanum boride. If the content of lanthanum boride exceeds 1.0%, there is a problem that crack generation or breakage accidents frequently occur during manufacturing with the present level of powder metallurgy, and the percent defective increases. As the content of lanthanum boride increases, the melting point lowers and the wear rate tends to increase. Consequently, for application to big currents, it is preferable to keep the amount of lanthanum boride 0.02% or more but not exceeding 0.2%.

This tungsten electrode material can also be used for electrodes for plasma melt-refining, plasma electrodes for tundish, electrodes for plasma welding, electrodes for TIG welding, and electrodes for electric discharge tubes for various types of lighting.

BEST FORM TO EMBODY THE INVENTION

Figure 1:
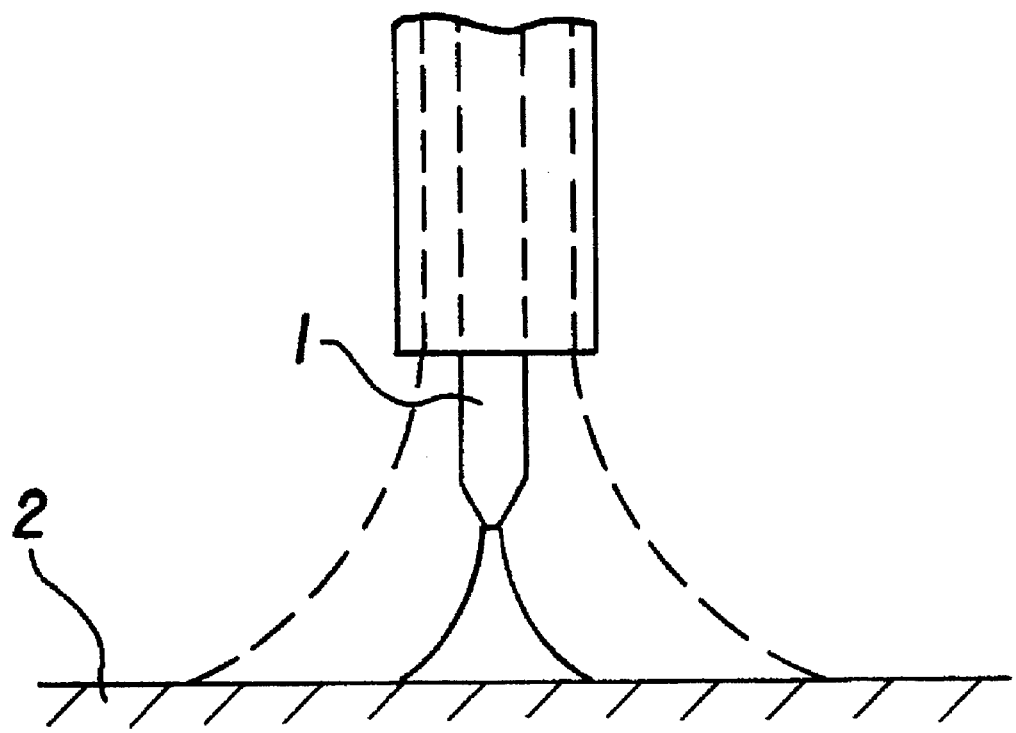
FIG. 1 is a drawing describing the testing conditions of the present invention.

To tungsten powders of mean particle size of 2.3 microns and with purity higher than 99.9%, lenthanum boride powders of mean particle size of 1.15 microns were thoroughly dry-mixed. The amount of lanthanum boride added was selected in such a manner that the amount of lanthanum boride in the final product was that shown in the table and the drawing. The tungsten (W)-lanthanum boride ($LaB_6$) powders obtained were compacted in a mold to make a green compact in the form of a square bar, which was pre-sintered and electric-sintered in accordance with a conventional method to make a 1000-gramingot. The sintering current density in this electric sintering was about 90% the fusing current.

The ingot obtained was subject to swaging, drawing, and other processing, and was finally made into an electrode in the form of a round bar. This electrode was 3.2 mm in outside diameter and the tip end was pointed into a conical form at 45 degrees. As shown in FIG. 1, this electrode 1 was held on the TIG welder torch and arc was generated at DC 100A in argon gas (6 L/min) with a water-cooled copper plate as base metal 2.

Arc was started with arc length of 4 mm and the electrode length of 4 mm, and the electric current was allowed to flow for one second and stopped for 10 seconds, 100 times, success and failure of arc ignition was investigated. Table 1 shows the results. In the same table, results of arc ignitability of thoriated tungsten electrodes popularly used presently under the same conditions are shown for comparison.

TABLE 1

| | Arc ignitability | | | |
| --- | --- | --- | --- | --- |
| Material | Frequency | Success | Failure | Rate of success (%) |
| Embodiment 0.6% $LaB_6$—W | 100 | 95 | 5 | 95 |
| Comparison 2.0% $ThO_2$—W | 100 | 57 | 43 | 57 |

Figure 2:
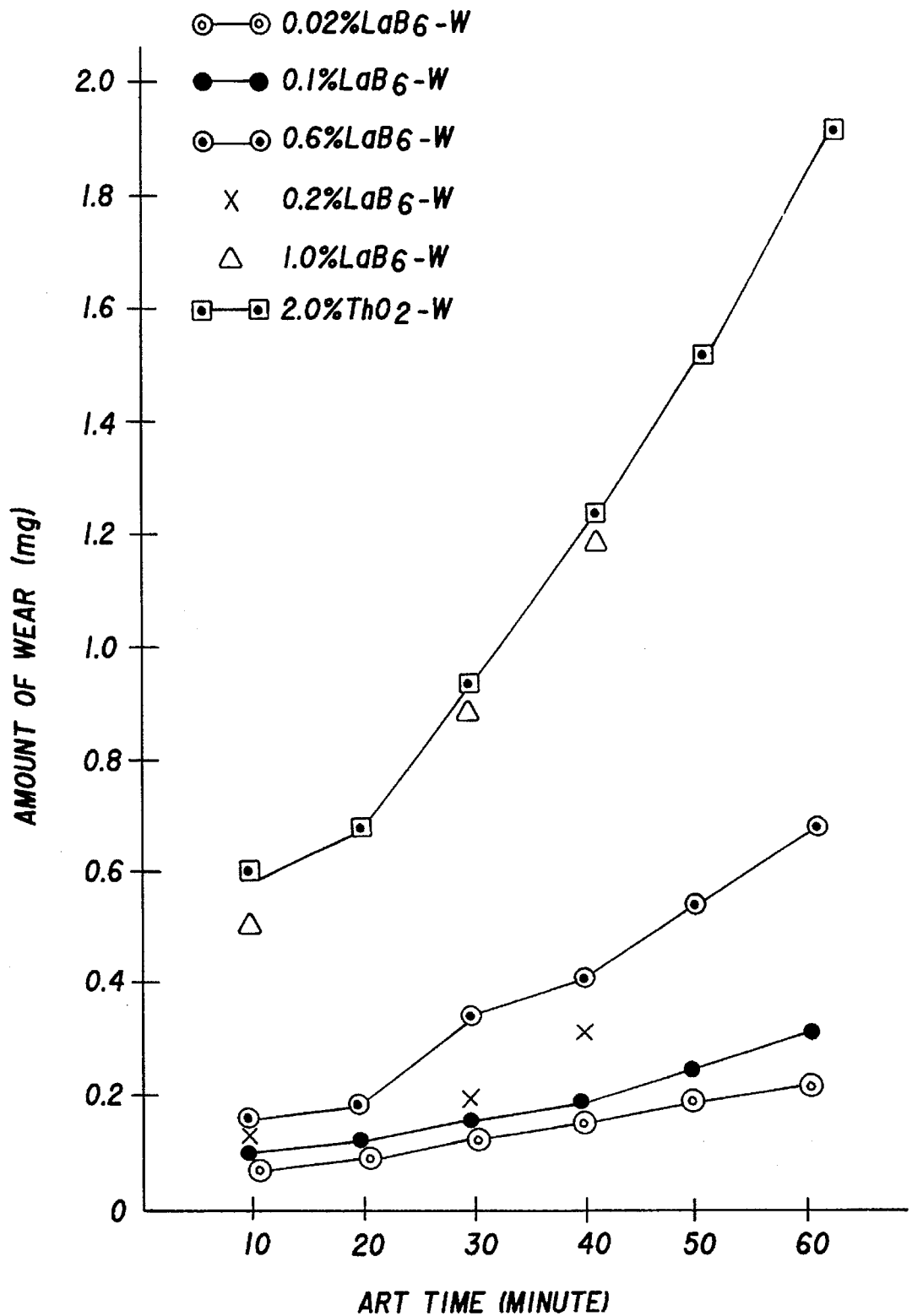
FIG. 2 is a graph showing the test results of wear resistance.

FIG. 2 shows the investigation results of wear resistance of tungsten-lanthanum boride electrode 3.2 mm in diameter. Test conditions include arc length of 4 mm, electrode length of 4 mm, argon gas flow rate of 15 L/mm, and electric current of DC 300A. Continuous ignition was carried out for 10, 20, 30, 40, 50, and 60 minutes on six specimens cut from the same electrode. As shown in the same drawing, the present invention provides super wear resistance as compared to conventional thoriated tungsten electrode material.

POSSIBILITY OF INDUSTRIAL APPLICATIONS

As described above, because tungsten electrode material according to the present invention provides excellent arc ignitability equivalent to or better than that of conventional thoriated tungsten electrode material and unrivalled wear resistance, and in addition, lanthanum boride added is not a radioactive material, it is safe both in manufacturing and application, and it can be ideally used as material for various electrodes.

We claim:

1. An electrode material consisting of 0.02–1.0 wt. % lanthanum boride and 99.0–99.98 wt. % tungsten.

* * * * *

UNITED STATES PATENT AND TRADEMARK OFFICE
CERTIFICATE OF CORRECTION

PATENT NO.: 5,512,240
DATED : April 30, 1996
INVENTOR(S): Fukuhisa MATSUDA et al It is certified that error appears in the above-identified patent and that said Letters Patent is hereby corrected as shown below:

Title page, item [19] and [75]: "Matusda" should read --MATSUDA--.

Signed and Sealed this

Twenty-fourth Day of September, 1996

Attest:

BRUCE LEHMAN

Attesting Officer        Commissioner of Patents and Trademarks